United States Patent
Benc et al.

(10) Patent No.: US 10,673,928 B2
(45) Date of Patent: Jun. 2, 2020

(54) SYSLOG ADVERTISEMENTS

(71) Applicant: Red Hat, Inc., Raleigh, NC (US)

(72) Inventors: Jiri Benc, Prague (CZ); Flavio Leitner, Maringa (BR)

(73) Assignee: RED HAT, INC., Raleigh, NC (US)

(*) Notice: Subject to any disclaimer, the term of this patent is extended or adjusted under 35 U.S.C. 154(b) by 244 days.

(21) Appl. No.: 15/056,753

(22) Filed: Feb. 29, 2016

(65) Prior Publication Data

US 2017/0251047 A1 Aug. 31, 2017

(51) Int. Cl.
| | |
|---|---|
| G06F 15/16 | (2006.01) |
| H04L 29/08 | (2006.01) |
| H04L 12/26 | (2006.01) |
| G06Q 30/02 | (2012.01) |
| H04L 12/24 | (2006.01) |

(52) U.S. Cl.
CPC ......... *H04L 67/06* (2013.01); *G06Q 30/0277* (2013.01); *H04L 41/046* (2013.01); *H04L 41/069* (2013.01); *H04L 43/16* (2013.01); *H04L 67/22* (2013.01)

(58) Field of Classification Search
CPC ......... H04L 67/06; H04L 41/06; H04L 43/16; H04L 67/10; H04L 67/24; G06Q 30/0277
USPC ...................................................... 709/217
See application file for complete search history.

(56) References Cited

U.S. PATENT DOCUMENTS

| | | | |
|---|---|---|---|
| 6,470,388 B1 | 10/2002 | Niemi et al. | |
| 7,624,177 B2 | 11/2009 | Desai et al. | |
| 7,941,526 B1 | 5/2011 | Hope et al. | |
| 8,386,409 B2 | 2/2013 | Sanders et al. | |
| 8,856,257 B1 | 10/2014 | Zhang et al. | |
| 2004/0128353 A1* | 7/2004 | Goodman | H04L 51/04 709/204 |
| 2006/0092861 A1* | 5/2006 | Corday | H04L 41/0213 370/256 |
| 2008/0209505 A1* | 8/2008 | Ghai | G06F 21/55 726/1 |
| 2009/0119307 A1 | 5/2009 | Braun et al. | |
| 2010/0211826 A1* | 8/2010 | Villella | G06F 11/3476 714/39 |
| 2014/0067377 A1* | 3/2014 | Reiter | G06F 17/28 704/9 |
| 2015/0281011 A1* | 10/2015 | Gates | H04L 41/065 709/224 |

(Continued)

FOREIGN PATENT DOCUMENTS

CN 102064969 A 5/2011

OTHER PUBLICATIONS

Oblivian, "How do I Configure Rsyslog to Send Logs from a Specific Program to a Remote Syslog Server?"—Ask Ubuntu, http://askubuntu.com/questions/186592/how-do-i-configure-rsyslog-to-send-logs-from-a-specific-program-to-a-remote-sysl, published on Sep. 11, 2012, 2 pages.

(Continued)

*Primary Examiner* — Sm A Rahman
(74) *Attorney, Agent, or Firm* — Womble Bond Dickinson (US) LLP; Daniel E. Ovanezian (57) ABSTRACT

A computer system identifies a pattern of log messages in view of an alarm rule. The computer system generates one or more log messages in view of the identified pattern of messages. The log messages comprise a commercial advertisement. The computer system transmits the one or more log messages to a log server.

20 Claims, 6 Drawing Sheets

(56) References Cited

U.S. PATENT DOCUMENTS

2016/0028772 A1* 1/2016 Eldar .................. G06F 21/6218
726/1

OTHER PUBLICATIONS

Hoffman, "How to View and Write to System Log Files on Ubuntu", http://www.howtogeek.com/117878/how-to-view-write-to-system-log-files-on-ubuntu/, Jul. 1, 2012, 4 pages.
Practical UNIX & Internet Security, "10.5 The UNIX System Log (syslog) Facility", Auditing and Logging, http://docstore.mik.ua/orelly/networking/puis/ch10_05.htm, retrieved on Feb. 9, 2016, 7 pages, Chapter 10.

\* cited by examiner

System Log File

| Date Time | Facility.Level | Message text |
|---|---|---|
| 2015-11-23 15:15:15 | User.Info | Delivery to User1 failed after 15 attempts |
| 2015-11-23 15:15:16 | Daemon.Info | User connected to website http://74.125.224.72/ |
| 2015-11-23 15:15:20 | User.Critical | Monitoring agent from Monitoring Company provides improv.... |
| 2015-11-23 15:15:12 | Local0.Info | User authorization attempt success |
| 2015-11-23 15:15:25 | User.Critical | to learn more about monitoring agent from Monitoring Comp.... |
| 2015-11-23 15:15:31 | Uswer.Warning | User attempted connection to website http://209.85.128.0/ |
| 2015-11-23 15:15:32 | Daemon.Error | User connection failure to website http://209.85.128.0/ |

SYSLOG ADVERTISEMENTS

TECHNICAL FIELD

Aspects of the present disclosure relate to monitoring and management of log files in a network.

BACKGROUND

A computer network may include various computer devices that may communicate log messages with one another or a log server. Certain components in a network may monitor the log messages and generate an alarm in response to certain conditions.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a method and system for providing commercial advertisements to a network administrator through the use of system logs. Network administrators may use a variety of tools to monitor the health of a network. The health of a network may be determined in part by reviewing the logs generated by network devices and programs operating on network devices. For example, some network administrators may use syslog messages between network devices to analyze individual systems and the network in general. Some networks may use monitoring agents to monitor system communications and generate alarms or communications to a network administrator, user, or to other entities. The alarms may include information indicating what triggered the alarm and the particular syslog message or messages that triggered the alert. For example, an alarm may be triggered by a monitoring agent based on a number of messages that fit a pattern. A pattern triggering an alarm may be as simple as a single syslog message that meets particular criteria. For example, a syslog message indicating a need for immediate attention by a system administrator may trigger an alarm by a monitoring agent to warn the network administrator of the message. In some examples, an alert may be triggered based on a pattern of syslog messages that occur. For example, an alarm may be triggered if a number of syslog messages including specified text occur within a set amount of time.

In addition to providing information about potential problems to a network administrator, other information may be passed in syslog messages. For example, some messages may be generated for debugging or informational purposes. Such messages may not be presented to a network administrator in an alarm provided by a monitoring system, but the messages may be stored in a log file. The log file may include syslog messages sent from a variety of network devices. The log file may be accessed by a network administrator or a network analysis tool in response to any later perceived issues with the network or as part of regular network maintenance activities.

In addition to providing information indicative of the health or status of a network, a network device or a program running on a network device may provide information advertising a product or service. For example, a program running on a computer system connected to a local network may provide a commercial advertisement to a network administrator advertising a product or service of a company associated with the program. As another example, a program running on a network device may provide commercial advertisements to a system administrator on behalf of other entities. A syslog commercial advertisement may be any communication provided to a network administrator that markets, promotes, or otherwise provides information for the purpose of advancing the interests of an entity other than the network administrator, for example. To provide the commercial advertisement to the network administrator, the network device may generate a syslog message that includes the commercial advertisement in a portion of the message. However, a network administrator may not review the entirety of a log file. Therefore, commercial advertisements sent as an informational syslog message may never be seen by a target network administrator.

In order to ensure that a commercial advertisement reaches a network administrator, the program or network device providing the commercial advertisement may generate a syslog message or series of syslog messages designed to trigger an alarm to the system administrator from a monitoring agent. For example, a program may access a database of patterns that trigger alarms by various monitoring agents. The program may then modify a syslog message to include a commercial advertisement message, while leaving the message elements that trigger the alarm. For example, if the alarm is triggered based on a severity of one or more syslog messages, the program may generate syslog messages with the severity required to trigger the alarm and insert a message with the text of a desired commercial advertisement.

Providing a commercial advertisement message in one or more syslog messages designed to trigger an alarm by a monitoring agent causes the monitoring agent to send an alarm to a network administrator or other entity. The alarm sent to the network administrator may reference the commercial advertisement message. In some examples, the alarm sent to the network administrator may include the commercial advertisement message or may direct the network administrator to review a log file for one or more syslog messages that include the commercial advertisement messages. In various implementations, the syslog monitoring agent may send an alarm to a computer program used by a network administrator, to an email address associated with the network administrator, to a phone number associated with the network administrator by SMS message or by automated phone call, or may be communicated to the network administrator by other methods. Although the examples described herein are generally discussed with reference to syslog protocol (e.g., the syslog protocol as defined by RFC 5424), other protocols for logging system events may be used as well. For example in addition to syslog protocols, a network may use Simple Network Management Protocol (SNMP), or other protocols that enable a system to monitor various network devices and events.

Syslog is a standard protocol for logging messages. The protocol enables network devices or applications to generate messages in a format recognized by a syslog logger. A syslog message may include a hostname, a timestamp, a facility code, a severity label, and a message. The facility code may indicate the type of program that generated a particular message. For example, the facility may indicate whether the program was generated from the kernel or user-space of a particular network device. The severity label may indicate the severity of the event generating a particular message. For example, some syslog messages may be generated simply to inform a network administrator of an event, while other syslog message may be generated to indicate that a network device has reached a critical state and may discontinue operation. Syslog recognizes eight levels of severity ranging from debugging to emergency conditions. The higher severity levels indicate increasingly problematic conditions for the network device or application outputting the syslog message. The severity levels recognized by syslog and a brief description are set out in Table 1 below.

TABLE 1

| Severity Level | Keyword | Description |
| --- | --- | --- |
| 0 | Emergency | System is unusable |
| 1 | Alert | Immediate action required |
| 2 | Critical | Critical condition |
| 3 | Error | Error condition |
| 4 | Warning | Warning condition |
| 5 | Notifications | Normal but significant or unusual conditions |
| 6 | Informational | Informational messages |
| 7 | Debugging | Debugging messages |

The format of the message component of a syslog message may change based on the application generating a syslog message. For example, the contents of a syslog message may be specific to a particular application. In addition to the facility, severity, and a message, a syslog message includes a timestamp indicating when the event occurred. This helps analyze the order of events that occurred on a network or particular part of a network. In addition, it may help determine the time between particular events. The syslog message may also include a hostname indicating the network device that generated the syslog message.

In the following description, numerous details are set forth, however, the present invention may be practiced without these specific details. In some instances, structures and devices are shown in block diagram form, rather than in detail, in order to avoid obscuring the present invention.

Figure 1:
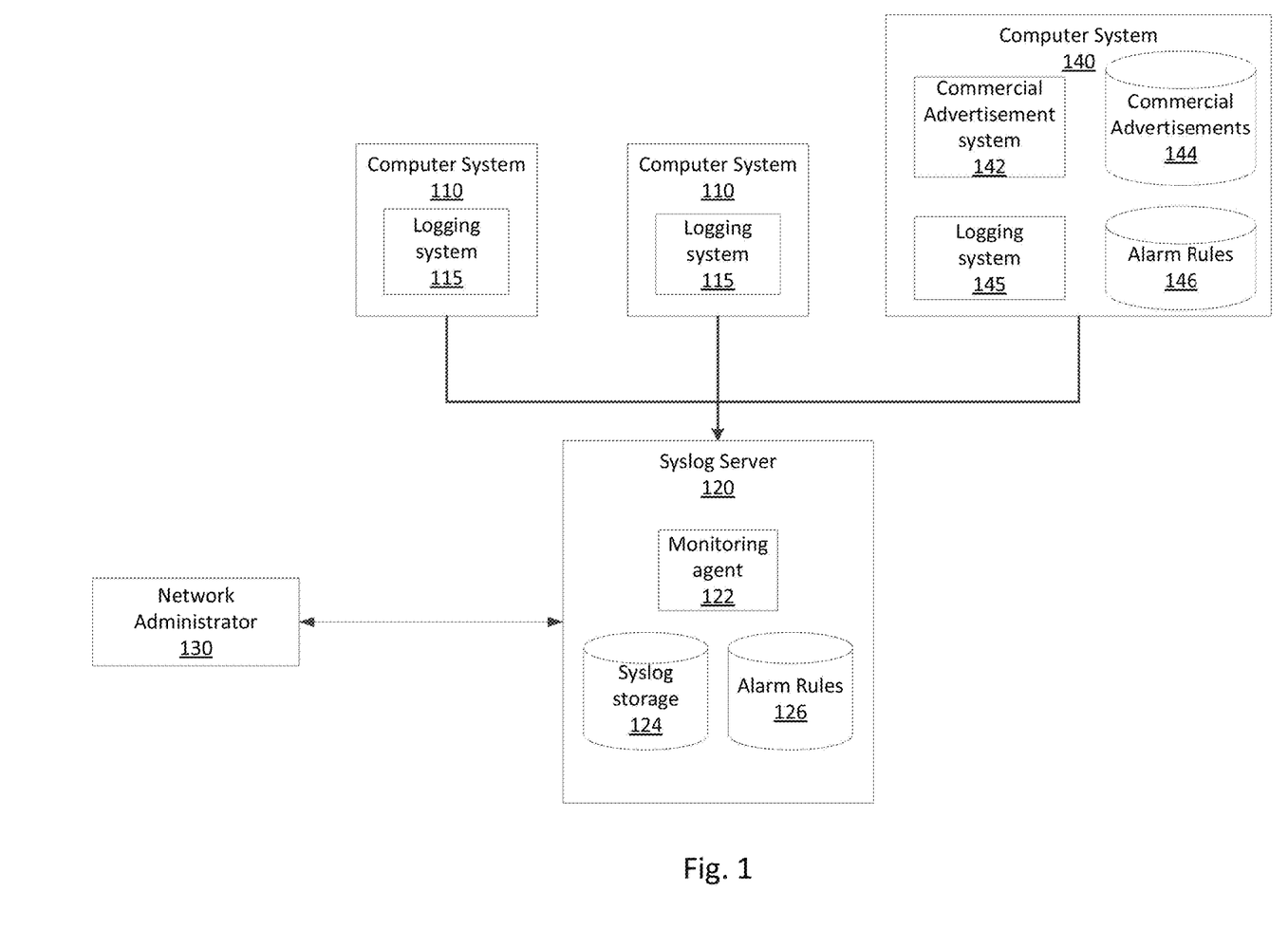
FIG. 1 is a block diagram that illustrates an example of a computer system operating in accordance with one or more aspects of the present disclosure.

FIG. 1 is a block diagram illustrating components of a network environment operating in accordance of the present disclosure. The network environment may include one or more computer systems 110, a syslog server 120, and a network administrator 130. The computer systems 110 may include one or more servers, user devices, printers, telecommunication interfaces, or any other devices capable of communicating over a network and providing syslog messages. The components illustrated in FIG. 1 may communicate over one or more networks. For example the components may communicate over a Local Area Network (LAN), a Wide Area Network (WAN), an intranet, an extranet, the Internet, or the like, for instance. Certain components may communicate over different networks. For example, the computer systems 110 may communicate with the syslog sever 120 over a LAN, while the syslog server 120 may communicate with the network administrator 130 over a telecommunications network. In some implementations, the computer system 110 and syslog server 120 may be the same computer system. For example, the syslog server 120 may operate on computer system 110. In such implementations, the computer system 110 and syslog server 120 may communicate over a loopback network device or over a bus of the computer system 110.

The computer systems 110 may each execute an operating system and one or more user applications. An operating system or applications executing on computer systems 110 may generate syslog messages. The syslog messages may be stored locally at computer system 110 or may be transmitted to a syslog server 120. The syslog messages may be transmitted to a syslog server 120 from computer system 110 using the User Datagram Protocol (UDP), for instance. A computer system 110 may include a logging system 115 that determines when to send syslog messages to a syslog server 120, retention policies for syslog messages, and how to transmit syslog messages. In some examples, the syslog messages are stored locally at the computer system 110, but are also transmitted to a syslog server 120. The syslog messages may be sent to the syslog server 120 in batches at predetermined intervals, in response to particular events, or as they are generated on the computer system 110. In some examples, only certain syslog messages are sent to syslog server 120. For example, only messages from a subset of facilities or having a subset of severity levels may be sent to the syslog server 120 from computer system 110. In some examples, each computer system 110 may have individual rules that determine how syslog messages are sent to a syslog server. For example, important servers may send all syslog messages as they are generated while a printer may only send syslog messages in response to conditions requiring attention. The operations of a logging system 115 on a computer system 110 may be performed by individual applications or the operating system of the computer system 110.

The syslog server 120 receives syslog messages from various computer system 110 as shown in FIG. 1. The syslog server 120 in FIG. 1 includes a monitoring agent 122, a syslog storage 124, and alarm rules 126. As the syslog server 120 receives syslog messages from computer systems 110, it may store the messages to syslog storage 124. In some examples, only a subset of the messages is stored. The syslog storage 124 may retain the syslog messages for only a predetermined length of time or until another limit such as available memory capacity is met. In some examples, the syslog messages may be sent to a separate archival storage location when the messages are removed from syslog storage 124.

Monitoring agent 122 may monitor syslog messages are they are received by syslog sever 120. The monitoring agent 122 may also monitor syslog messages by reading them from syslog storage 124. Monitoring agent 122 may generate one or more outputs in response to monitoring received syslog messages. For example, the monitoring agent 122 may generate statistics for the network, for particular network devices, or for a set of network devices. The monitoring agent 120 may also generate a report providing analysis of events and the health or status of the network and particular network devices. The reports or analysis generated by the syslog server 120 may be sent to, or accessed by, the network administrator periodically or in an ad hoc manner.

In addition to generating reports and analysis, the syslog server 120 may generate and provide alarms to network administrator 130 in response to certain syslog messages or patterns of syslog messages. For example, the syslog server 120 may include alarm rules 126 that set parameters for triggering an alarm. In some implementations, the alarm rules 126 and monitoring agent 122 may be implemented on a separate system from syslog server 120. The alarm rules 126 may include a condition such as a particular text in a syslog message, particular severity, particular facilities, or the like that trigger an action, such as an alarm. For example, particular alarm rules may include a condition and a response to the condition. For instance, the condition may be a conditional statement describing parameters of syslog messages that must be met to satisfy the condition. The response may then be an action to take in the event a syslog message satisfies the condition. For example, the response may be to generate an alarm having certain characteristics. The alarm rules 126 may also include additional parameters for generating an alarm. For example, some rules may trigger an alarm based on a number of occurrences of particular text in a predetermined amount of time. Another example rule may trigger an alarm based on the number or frequency of syslog messages received from a particular network device, facility, or at a particular severity. The alarm rules 126 may include rules indicating that an alarm is likely to be generated by a monitoring agent in response to any feature of any number of log messages that are transmitted to the syslog server. The alarm rules 126 may be received from the network administrator 130. In an example, the alarm rules 126 may be generated by monitoring agent 122, or may be received by monitoring agent 122 over a network. The alarm rules 126 may be updated periodically to adapt to changing threats to the computer network or particular network devices operating on the computer network.

In response to determining that a syslog message or set of syslog messages trigger an alarm based on alarm rules 126, the monitoring agent 122 may generate an alarm to provide to network administrator 130. The generated alarm may include the text of the messages triggering the alarm, a description of why the alarm was triggered, a time when the alarm was triggered or the syslog messages were sent, or other information helpful to describe the alarm condition. The monitoring agent 122 may then transmit the alarm to network administrator 130. The alarm may be transmitted in one or more manners to provide notice of the condition causing the alarm to the network administrator 130. For example, the syslog server 120 may send an alarm via email, SMS message, automated telephone call, to a related application on a mobile device, to a messaging service on an associated computer, or by other means of providing a message to a network administrator 130. In some implementations, the monitoring agent 122 may not send an alarm to the network administrator, but may maintain a list of syslog messages of potential significance (e.g., satisfied a rule). A network administrator may then access the list of syslog messages during normal monitoring activities of the network administrator.

In addition to the computer systems 110 discussed above, some computer systems 110 may include additional components to generate commercial advertisements to provide to a network administrator 130. For example, computer system 140 may include a commercial advertisement system 142, storage for commercial advertisements 144, a logging system 145, and storage for alarm rules 146. The computer system 140 may execute an operating system and additional applications in addition to those illustrated in FIG. 1. The computer system 140 may include various hardware components including a processing device, storage devices, input/output device, drivers, network devices (for example, physical switches or other network devices), or the like. Storage devices may be non-volatile memory, such as a hard disk drive, tape drive, flash memory, optical disc drive or the like. The computer system 140 may be a personal computer (PC), server computer, mainframe, handheld device, portable computer, set-top box or any other computer system.

The computer system 140 may generate syslog messages in a manner to trigger syslog server 120 to send an alarm to network administrator 130. Commercial advertisement system 142 may be an application executing on computer system 140 that generates the syslog messages to trigger an alarm. The commercial advertisement system 142 may access alarm rules 146 to determine a pattern of messages that will trigger an alarm. In an example the alarm rules 146 may be similar or identical to alarm rules 126 stored at the syslog server 120. For example, the alarm rules 146 may replicate some or all of the rules used by monitoring agent 122. Thus, the commercial advertisement system 142 may generate a syslog message that triggers a predictable alarm by the monitoring agent 122. The commercial advertisement system 142 may select a rule from alarm rules 146 in a manner to prevent the syslog server 120 from updating alarm rules 126 to avoid future commercial advertisements. For example, the commercial advertisement system 142 may select an alarm rule from alarm rules 146 at random, may select an alarm rule from alarm rules 146 in a round robin fashion, or may select newly added alarm rules that are likely to be important to counteract a threat to network security.

Based on a selected rule, the commercial advertisement system 142 may generate a template syslog message for sending to syslog server 120. In some examples, instead of or in addition to storing alarm rules 146, the computer system may store a set of message templates that are designed to generate an alarm based on alarm rules 146 or 126. A template message may include the elements that trigger an alarm. For example, the template message may include a particular facility, severity, or text that meets the pattern in an alarm rule. Template messages may be stored with the elements designed to trigger an alarm inserted into a syslog message. The elements of the syslog message that do not include elements designed to trigger an alarm may be left empty or may store a wildcard character that can be filled by the commercial advertisement system 142 when generating syslog messages. In some implementations, a template message may include all of the information for a syslog message except the advertisement including hostname, facility, severity, and any text in the message that may trigger an alarm. Thus, the commercial advertisement system 142 may insert a commercial advertisement into the template message to provide to the syslog server 120.

Some template messages may include more than one syslog message for the computer system 140 to transmit to the syslog server 120. For example, a template message may include three syslog messages that are stored together to be provided to syslog server 120 in a set period of time to trigger an alarm. Each of the three syslog messages may include the elements that trigger an alarm and an indication of a place to insert an advertisement. The commercial advertisement system 142 may then insert part of a commercial advertisement into each of the multiple template messages or may insert repeated or different commercial advertisements into the template messages. For example, the commercial advertisement system 142 may split a commercial advertisement comprising a string into three smaller strings to insert into the template message. The strings may be approximately equally sized based on characters. In some implementations, the commercial advertisement system 142 may split the string at whitespaces to keep complete words together. In some implementations, some advertisements in commercial advertisements 144 may include an indication of where to split an advertisement into more than one piece or may be stored as separate strings to send in multiple messages. The commercial advertisement system 142 may use template messages having the same number of syslog messages as the number of strings for a particular commercial advertisement. The commercial advertisements 144 may be received from another network location. The commercial advertisements 144 may be received from a company or other entity associated with an application operating on computer system 140. For example, the computer system 140 may receive the commercial advertisements 144 over a network or from a program operation on computer system 140. In some implementations, the computer system 140 may filter or sort the received advertisements based on length, source, time of receipt, or other characteristics of the commercial advertisements. A company or other entity may update commercial advertisements 144 periodically with new commercial advertisements or updated commercial advertisements. In some examples, commercial advertisement system 142 is a subsystem of another application operating on computer system 140.

The commercial advertisement messages generated by the commercial advertisement system 142 are then transmitted to syslog server 120. In some example implementations, the computer system 140 may include a logging system 145 that transmits syslog messages to syslog server 120. For example, logging system 145 may be the same or similar to logging systems 115 operating on computer systems 115.

The syslog message or pattern of syslog messages provided to the syslog server 120 from commercial advertisement system 142 is analyzed by syslog server 120 in the same manner as other syslog messages. Thus, if the alarm rule from alarm rules 146 used by commercial advertisement system 142 to generate the syslog message matching one of alarm rules 126, the monitoring agent 122 may generate an alarm message to transmit to network administrator 130.

Figure 2:
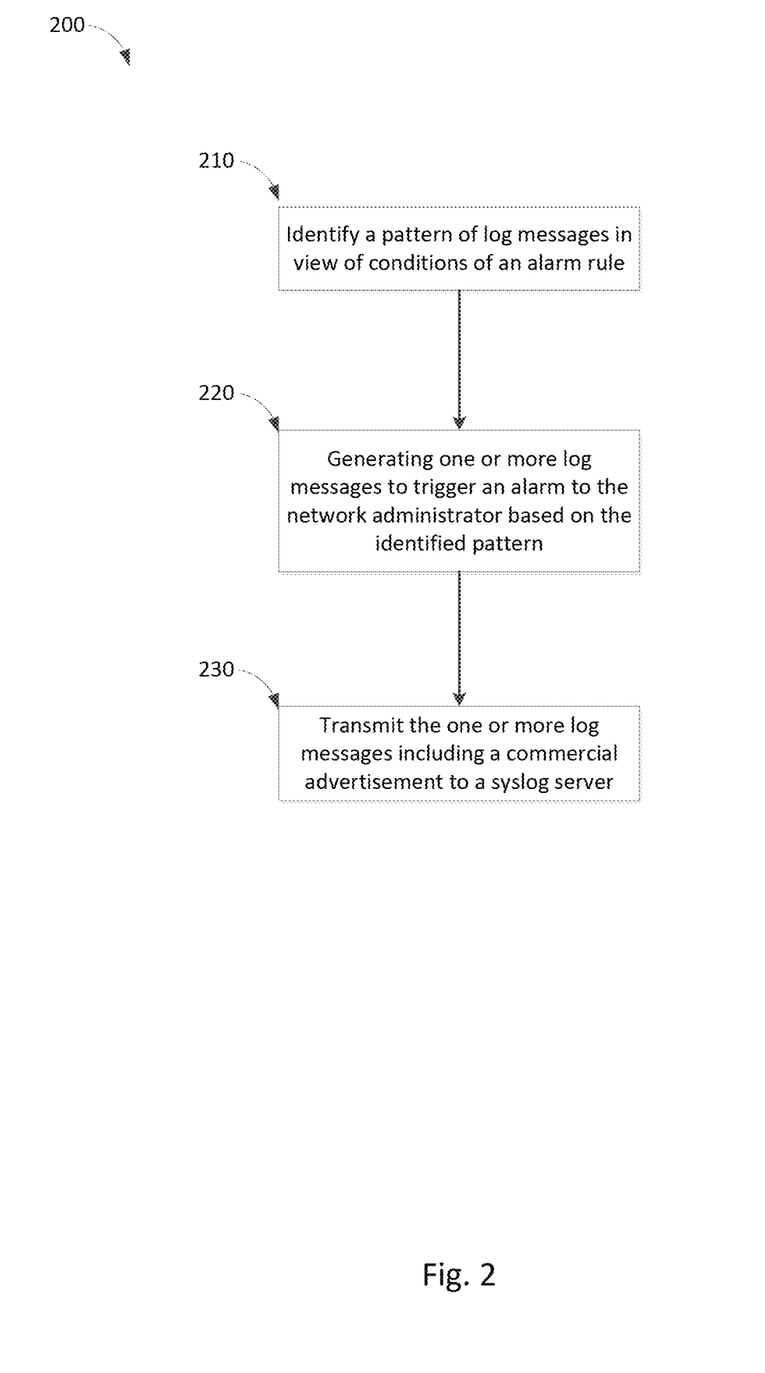
FIG. 2 is a flow diagram that illustrates an example method of providing an advertisement, in accordance with some aspects of the disclosure.

FIG. 2 is a flow diagram 200 that illustrates an example method of providing a commercial advertisement in a syslog message to a syslog server, in accordance with some aspects of the disclosure. Beginning in block 210, a computer system identifies a pattern of log messages in view of conditions of an alarm rule. For example, the computer system may identify a pattern of messages that may trigger an alarm to a network administrator. For example, with reference to FIG. 1, the commercial advertisement system 142 may access alarm rules 146 to identify a pattern of messages that may trigger an alarm to a network administrator. The pattern of messages may be a single message matching particular characteristics, or may be a set of messages that together match a pattern that generates an alarm. For example, a pattern of messages may be a single message from the kernel indicating an error condition or multiple warnings from a user-space application within a predetermined amount of time. As an example, an alarm rule may comprise a condition and an action. The computer system may parse the text of the alarm rule to identify the pattern of messages as the condition of the alarm rule. For instance, the computer system may store the condition of the alarm rule as the identified pattern. The pattern may include one or more elements stored in an array that each must be satisfied to satisfy the condition of an alarm rule. The individual elements of the array may include a syslog field (e.g., facility, hostname, severity, message text, or the like) and the data that satisfies the pattern (e.g., a particular severity). In some implementations, the pattern of messages may include an entry for each message to satisfy a condition (e.g., in the case the condition is satisfied by more than one message) and each entry may include elements of the message that satisfy the condition. The pattern of messages may also be stored with an indicator of a time window for the messages to be sent.

Moving on to block 220, the computer system generates one or more log messages to trigger an alarm to the network administrator based on the identified pattern. For example, the computer system may generate a template message that includes the elements that would trigger an alarm. A computer system may generate a template message based on a particular alarm rule or pattern of messages. For example, an alarm rule may include a condition that generates an alarm. The elements that generate an alarm in the alarm rule may be stored into the appropriate place in a template message. For example, if an alarm rule includes a condition that is satisfied when a severity is greater than or equal to a particular level, the computer system may store that severity into the template message. The template message may include a particular facility, severity, or a partial message that includes text that triggers an alarm as discussed above. The computer system may then access a commercial advertisement to insert into the generated message or messages. For example, the computer system may retrieve a commercial advertisement from a database of commercial advertisements. The commercial advertisement may include a portion of text that would provide information to a network administrator regarding a particular product or service. For example, the length of the text may be limited to fit on a single viewable line of a syslog server. If the commercial advertisement is over a particular length, it may be split between multiple messages. In addition, if a pattern of messages includes as a condition in an alarm rule includes more than one message, the commercial advertisement may be repeated in each message, or the commercial may be split into multiple pieces to each be transmitted with one of the messages in the pattern of messages. For example, if a condition of an alarm rule is satisfied based on two messages in a period of time and a commercial advertisement is 100 characters, then the first 50 characters may be inserted into the first message and the second 50 characters may be inserted into the second message.

After the syslog message or messages have been generated, the computer system transmits the message to a syslog server in block 230. The syslog message(s) may be provided to the syslog server using UDP or another protocol that may provide acknowledgement of receipt by the syslog server. After the syslog server receives the syslog message it may be analyzed by the syslog server and generate an alarm to the network administrator that includes the commercial advertisement placed in the message.

Figure 3:
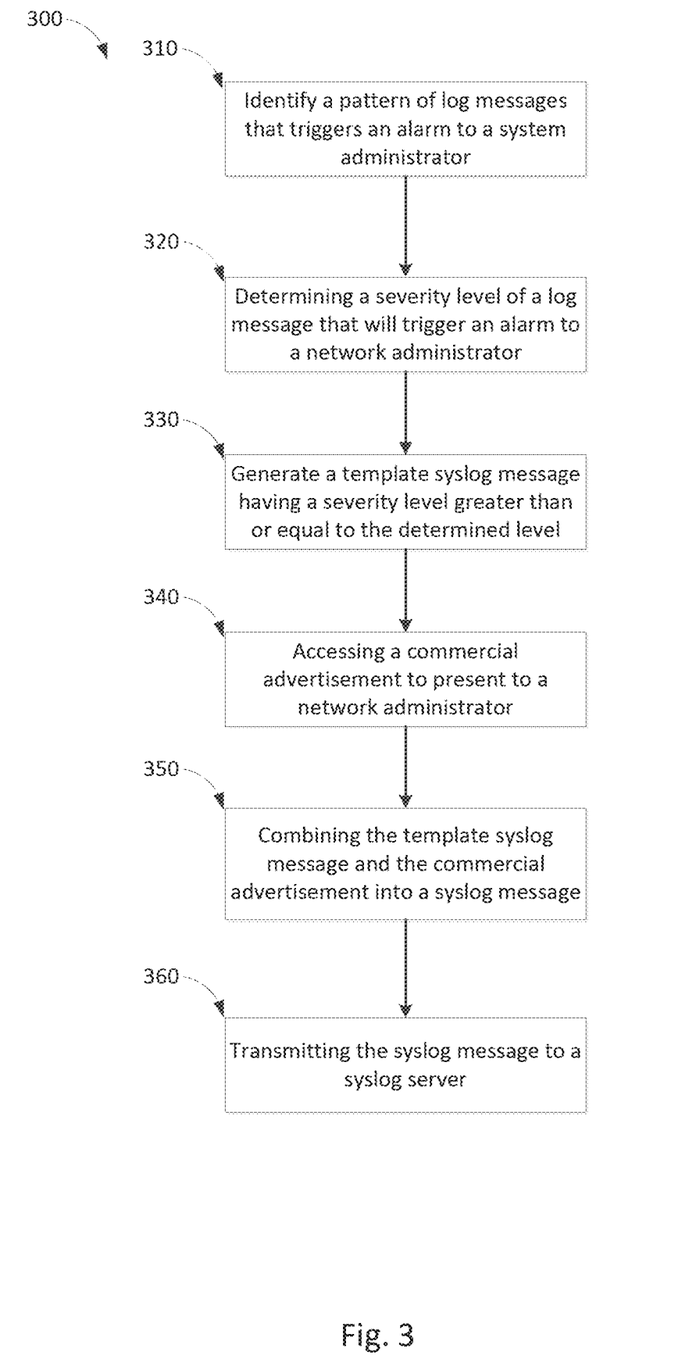
FIG. 3 is a flow diagram that illustrates an example method of providing a commercial advertisement, in accordance with some aspects of the disclosure.

FIG. 3 is a flow diagram 300 that illustrates an example method of providing a commercial advertisement, in accordance with some aspects of the disclosure. Beginning in block 310, a computer system identifies a pattern of log message that triggers an alarm to a system administrator. For example, with reference to FIG. 1, the commercial advertisement system 142 may access alarm rules 146 to identify a pattern of messages that may trigger an alarm to a network administrator. For example, the pattern of messages may be based on satisfying a condition included in an alarm rule. The pattern of messages may be a single message matching particular characteristics, or may be a set of messages that together match a pattern that generates an alarm. For example, a pattern of messages may be a single message from the kernel indicating an error condition or multiple warnings from a user-space application within a predetermined amount of time.

Moving on to block 320, the computer system determines a severity level of a log message that will trigger an alarm to a network administrator based on the condition of the alarm rule. For example, the pattern identified in block 310 may indicate that syslog messages with a severity level over a specified level will trigger an alarm to the network administrator. In block 330, the computer system may generate a template syslog message having a severity level greater than or equal to the determined severity level. For example, if the alarm rule indicated that all syslog messages of severity level warning or greater generate an alarm, then the template syslog message may be one of an emergency, alert, critical, error, or warning severity. As discussed with reference to FIG. 3, the template message is generated to match a severity level of a condition included in an alarm rule. However, in example implementations the template message may include other elements. For example, a template message may include a facility code that in conjunction with a severity level generates an alarm. In addition, particular text may be used in the message portion of a syslog message. Furthermore, while described in reference to FIG. 3 as generating a single syslog message, an alarm rule may indicate that multiple messages are necessary to trigger a particular alarm. Then, multiple syslog template messages may be generated to produce an alarm when sent to a syslog server together or within a set amount of time.

In block 340, the computer system accesses a commercial advertisement to present to a network administrator. For example, as described with reference to FIG. 1, an advertising system 142 may access a commercial advertisement from a set of commercial advertisements 144 stored in a local memory. The computer system may select a particular commercial advertisement based on a match between the advertisement to a length available in a template message, based on when the commercial advertisement was received, based on the last time or the number of times a commercial advertisement has been sent, or based on other criteria based on characteristics of the commercial advertisements. For example, the newest commercial advertisement may be sent first or the commercial advertisements may be sent in a round-robin schedule. In some implementations, the commercial advertisements may be stored in a remote location. In some implementations, the method in FIG. 3 may be started when a commercial advertisement is received by the computer system for presentation to a network administrator. For example, a separate third party system may provide commercial advertisements to provide in syslog messages. Then the computer system may generate a syslog commercial advertisement in response to receipt of the commercial advertisement.

In block 350, the computer system combines the generated template syslog message and the accessed commercial advertisement into a syslog message. For example, if the template syslog message is generated with a particular severity level higher than warning as described above, then the message portion of the syslog message may include the text of the accessed commercial advertisement.

After the syslog message or messages have been generated, the computer system transmits the message to a syslog server in block 360. The syslog message(s) may be transmit using UDP or another protocol that may provide acknowledgement of receipt by the syslog server. After the syslog message is transmit, it may be analyzed by the syslog server and generate an alarm to the network administrator that includes the commercial advertisement placed in the message.

Figure 4:
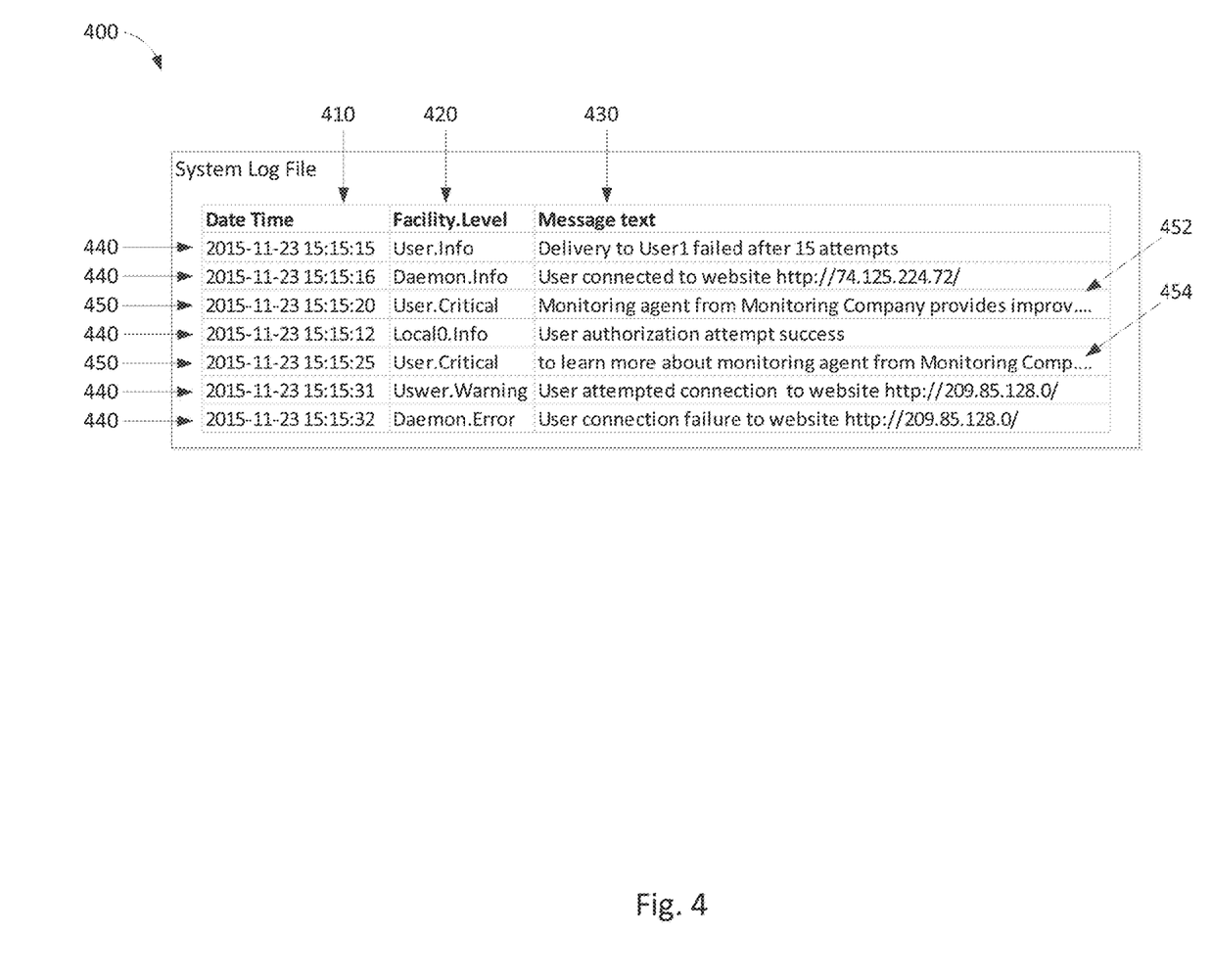
FIG. 4 is an example user interface that illustrates an example of log messages in a log file, in accordance with some aspects of the disclosure.

FIG. 4 is an example user interface 400 that illustrates an example of log messages in a log file, in accordance with some aspects of the disclosure. In some implementations, the user interface may be presented on a computer device associated with a network administrator or a syslog server. The log file may include entries 440 and 450 from a variety of sources. For example, the log file may include entries 440 and 450 received from several different computer devices as described with reference to FIG. 1. For each entry 440 and 450 in the log file, the log file may include a timestamp 410, a facility indicator 420, a severity indicator 420, and message text 430. In some embodiments, the log file may also include a hostname indicator indicating the source of the syslog messages.

In an implementation of providing syslog commercial advertisements to a network administrator, a commercial advertisement may be passed to the network administrator by placing text into a syslog message to be included in a log file. For example, in FIG. 4, the text of a commercial advertisement message is visible in entries 450. In the example, the partial text of two syslog messages that make up a commercial advertisement are visible the in message text field. The first portion of text 452 makes up the first part of a commercial advertisement and the second portion of text 454 makes up the second part of the commercial advertisement. Transmitting the text of a commercial advertisement to a syslog server to include in a log file 400 may provide the commercial advertisement to a network administrator. However, to increase the chance of a network administrator receiving the commercial advertisement, the severity level of the commercial advertisement may be set to a severity level above a threshold. For instance, in the example, entries 450 set a severity level to critical. Thus, a network administrator may note the text of the syslog message in the log file. In addition, if the commercial advertisement was placed into the syslog messages in a manner as described above, the syslog messages may generate a warning to the network administrator. For example, the syslog messages in FIG. 4 may each satisfy an alarm rule for a single syslog message that is above a severity level of critical. Alternatively, the syslog messages may combine to satisfy an alarm rule for two syslog messages over a severity level of critical from a particular facility within a set amount of time of 15 seconds.

Figure 5:
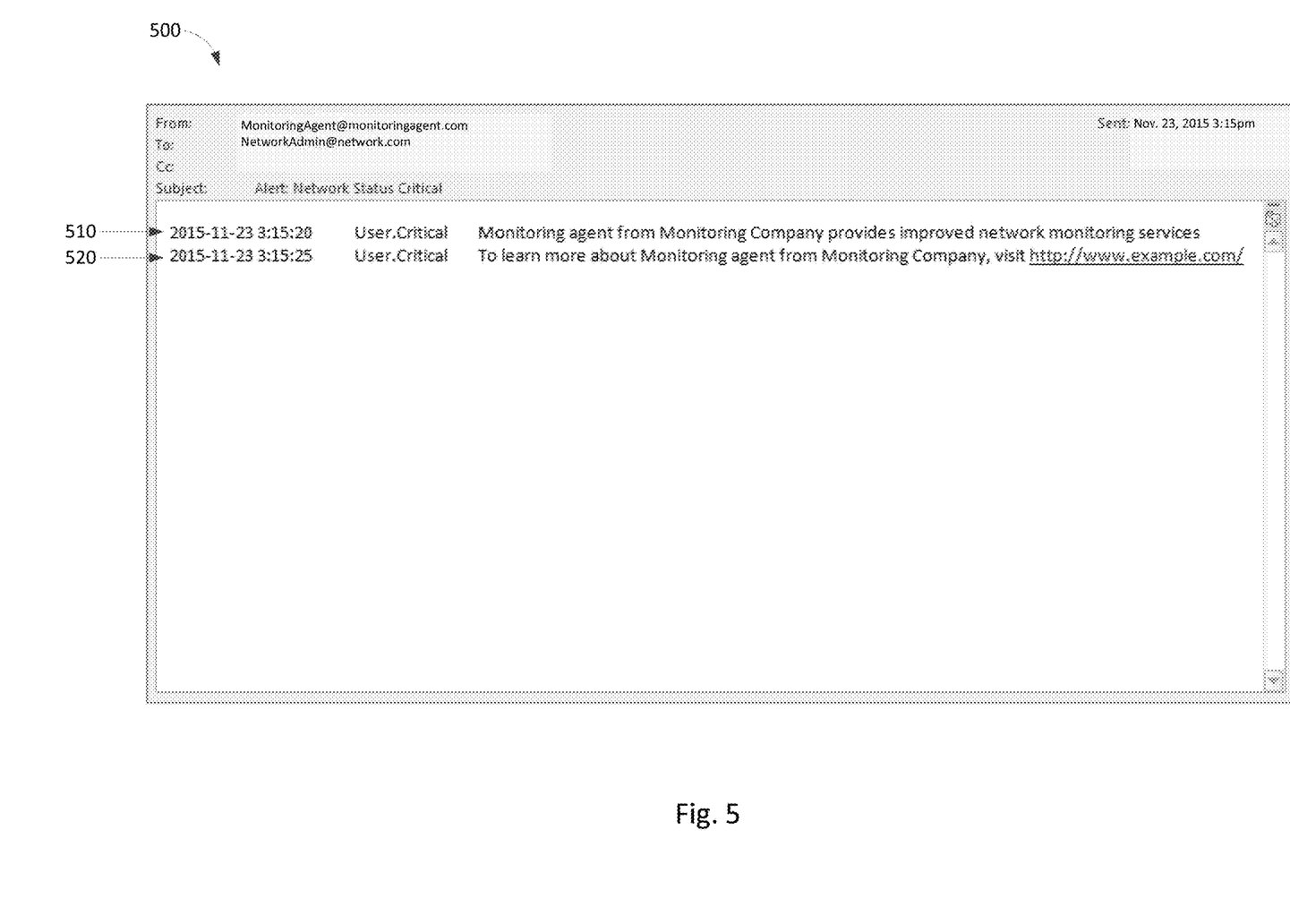
FIG. 5 is an example user interface that illustrates an alarm generated by a monitoring system, in accordance with some aspects of the disclosure.

In response to receiving the syslog messages satisfying an alarm rule, a monitoring agent may recognize the syslog messages and generate an alarm to the network administrator. FIG. 5 is an example user interface 500 that illustrates an alarm generated by a monitoring system, in accordance with some aspects of the disclosure. For example, the user interface 500 illustrated in FIG. 5 may be generated based on the syslog messages 450 described with reference to FIG. 4. User interface 500 illustrates an email message sent from a monitoring agent to a network administrator. Instead of an email message, the alarm may be sent as an SMS message, through a messaging application, in an alert window of the network administrator, through an automated telephone call, or other methods that provide the information to a network administrator.

The example user interface 500 includes the text of the messages 510 and 520 that generated the alarm. For example, the syslog message 510 and 520 are included in the body of the email in FIG. 5. The alarm rule that generated the alarm in FIG. 5 may have required multiple messages having a severity level over a certain threshold severity level in a specified period of time. Thus, the messages are sent together to the network administrator in the alarm. Thus, the first message 510 and the second message 520 may be read together by the network administrator when viewing the alarm. In some implementations, instead of providing the syslog messages in the alarm, the monitoring agent may provide a summary of the syslog messages and direction for the location (e.g., timestamp, hostname, facility, or the like), of the syslog messages that generated the alarm.

Figure 6:
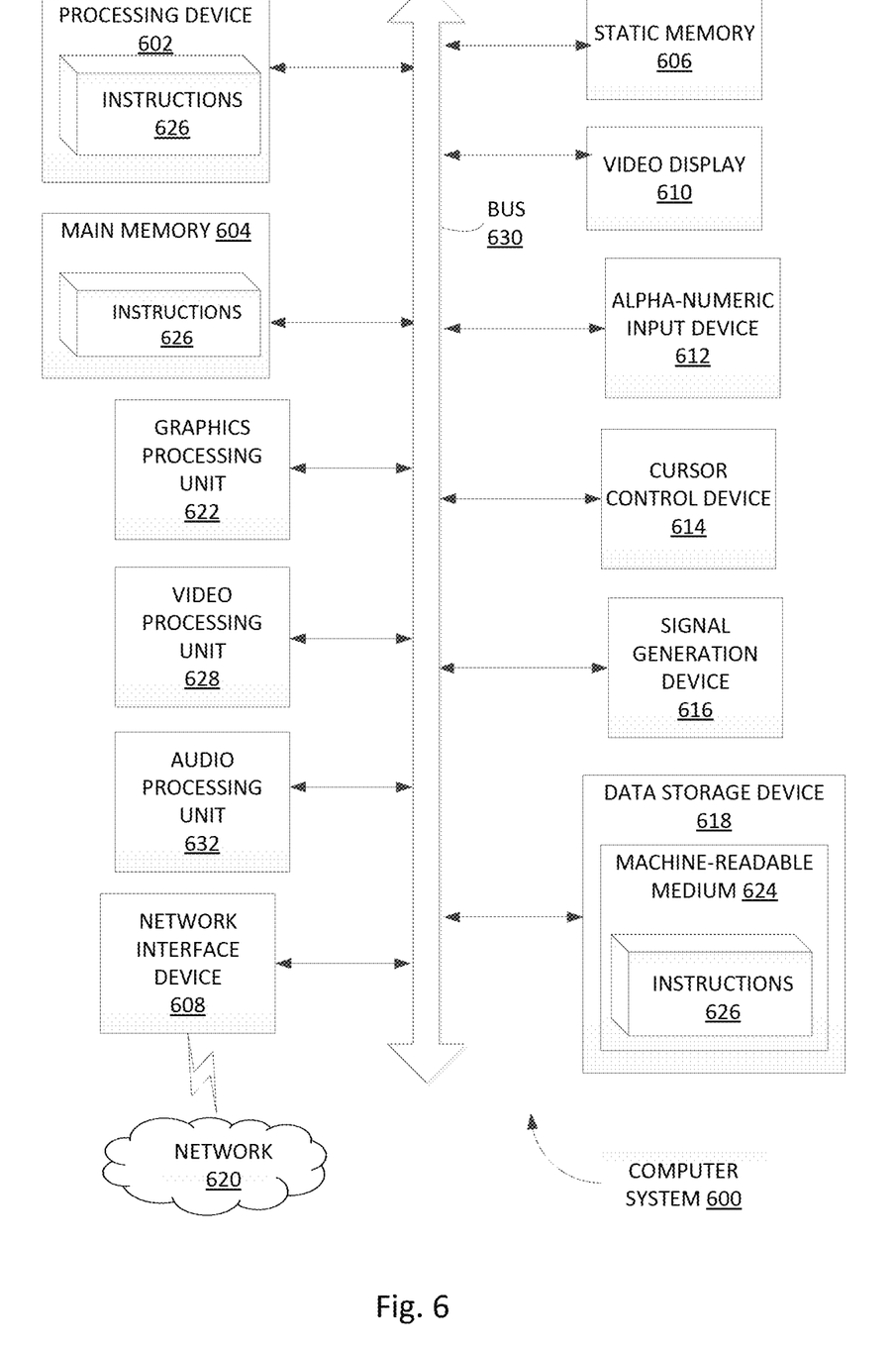
FIG. 6 illustrates an illustrative computer system operating in accordance with one or more aspects of the present disclosure.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to the computer system 140 of FIG. 1. In some embodiments of the present invention, the machine may be connected (e.g., networked) to other machines (e.g., other computer systems in a network with computer system 140) in a Local Area Network (LAN), an intranet, an extranet, or the Internet. The other machines may correspond to computer systems 110 or syslog server 120 of FIG. 1, for example. The computer system 600 may also send communications to itself through a loopback network device. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other or other components via a bus 630.

The processing device 602 represents one or more processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically a computer-readable storage medium) 624 on which is stored one or more sets of instructions 626 embodying any one or more of the methodologies or functions described herein (e.g., advertising system 142, logging system 145, or the like). The instructions 626 may also reside, completely or at least partially, within the main memory 604 and/or within the processing device 602 during execution thereof by the computer system 600, the main memory 604 and the processing device 602 also constituting machine-readable storage media. Main memory 604, or data storage device 618 may include a shared memory space for communication between various components executed by instructions as described herein.

While the computer-readable storage medium 624 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies disclosed herein. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various computer systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying a plurality of alarm rules to trigger an alarm at a log server;
   selecting an alarm rule from the plurality of alarm rules, wherein the alarm rule is selected in view of preventing the loci server from updating the plurality of alarm rules;
   identifying, by a processing device, a pattern of log messages, wherein the pattern of log messages satisfies a condition associated with the alarm rule to trigger the alarm at the log server;
   identifying, in view of the alarm rule, a set of severity levels that causes receipt of log messages by the log server;
   generating a template message that satisfies the condition and a severity level of the set of severity levels associated with the alarm rule that causes receipt of the loci messages by the log server;
   generating, by the processing device, one or more log messages in view of the template message, wherein the one or more log messages comprise a commercial advertisement promoting an entity other than the log server; and
   transmitting, by the processing device, the one or more log messages to the log server.

2. The method of claim 1, wherein generating a particular one of the one or more log messages comprises:
   determining the severity level of the set of severity levels of a log message that satisfies a condition of the alarm rule;
   accessing the commercial advertisement for presentation to a network administrator from a memory device associated with the processing device; and
   providing a message comprising a severity label of the determined severity level and the commercial advertisement.

3. The method of claim 1, wherein the alarm rule is based on at least one of a severity label, a facility code, or a timestamp.

4. The method of claim 1, wherein transmitting the one or more log messages comprises providing the one or more log messages to the log server using syslog protocol.

5. The method of claim 1, wherein a particular one of the one or more log messages comprises a severity label of emergency, alert, critical, or error.

6. The method of claim 1, wherein the one or more log messages comprises two or more log messages each comprising a severity label over a threshold level.

7. The method of claim 6, wherein the two or more messages each comprise a different portion of the commercial advertisement.

8. A system comprising:
   a memory;
   a processing device coupled to the memory, the processing device to:
   identify a plurality of alarm rules to trigger an alarm at a log server;
   select an alarm rule from the plurality of alarm rules, wherein the alarm rule is selected in view of preventing the loci server from updating the plurality of alarm rules;
   access, by the processing device, the alarm rule comprising a condition associated with the alarm rule and a severity level that causes receipt of log messages by the log server, wherein satisfying the condition triggers the alarm at the log server based on the alarm rule;

generate, by the processing device, a template message that satisfies the condition and the severity level associated with the alarm rule;

generate, by the processing device, a log message comprising a commercial advertisement promoting an entity other than the log server in view of template message, wherein the log message satisfies the condition; and transmit, by the processing device, the log message to the log server.

9. The system of claim 8, wherein to generate the log message comprises the processing device to:

select the commercial advertisement from a plurality of commercial advertisements; and insert the commercial advertisement into the template message.

10. The system of claim 9, wherein the processing device selects the commercial advertisement in view of a time the commercial advertisement was received, a time the commercial advertisement was previously sent, an origin of the commercial advertisement, or a length of the advertisement.

11. The system of claim 8, wherein the template message comprises at least one of a severity indication, a facility indication, or a timestamp.

12. The system of claim 8, wherein to transmit the log message, the processing device is to provide the one or more log messages to the log server using syslog protocol.

13. A non-transitory machine-readable storage medium comprising instructions that, when accessed by a processing device, causes the processing device to:

identify a plurality of alarm rules to trigger an alarm at a log server;

select an alarm rule from the plurality of alarm rules, wherein the alarm rule is selected in view of preventing the loci server from updating the plurality of alarm rules;

identify a pattern of log messages, wherein the pattern of log messages satisfies a condition associated with the alarm rule to that trigger the alarm at the log server;

identify, in view of the alarm rule, a set of severity levels that causes receipt of log messages by the log server;

generate a template message that satisfies the condition and a severity level of the set of severity levels associated with the alarm rule that causes receipt of the loci messages by the log server;

generate by the processing device, one or more log messages in view of the template message, wherein the one or more log messages comprise a commercial advertisement promoting an entity other than the log server; and transmit the one or more log messages to the log server.

14. The non-transitory machine readable storage medium of claim 13, wherein to generate the one or more log messages, the instructions cause the processing device to:

access the commercial advertisement from a memory device associated with the processing device; and combine the commercial advertisement with the template message.

15. The non-transitory machine readable storage medium of claim 13, wherein the one or more log messages comprises at least one of a severity label, a facility code, or a timestamp.

16. The non-transitory machine readable storage medium of claim 13, wherein to generate the one or more log messages, the instructions cause the processing device to provide the one or more log messages to the log server using syslog protocol.

17. The non-transitory machine readable storage medium of claim 13, wherein to generate the one or more log messages, the instructions cause the processing device to generate a particular one of the one or more log messages having a severity label of higher severity than a threshold severity label.

18. The non-transitory machine readable storage medium of claim 13, wherein to generate the one or more log messages, the instructions further cause the processing device to generate two or more log messages each comprising a severity label over a threshold level.

19. The non-transitory machine readable storage medium of claim 18, wherein to transmit the one or more log messages to a log server, the instructions further cause the processing device to transmit the two or more log messages within a set amount of time.

20. The non-transitory machine readable storage medium of claim 18, wherein the two or more messages each comprise a different portion of the commercial advertisement.

* * * * *

UNITED STATES PATENT AND TRADEMARK OFFICE
CERTIFICATE OF CORRECTION

PATENT NO. : 10,673,928 B2
APPLICATION NO. : 15/056753
DATED : June 2, 2020
INVENTOR(S) : Jiri Benc et al.

It is certified that error appears in the above-identified patent and that said Letters Patent is hereby corrected as shown below:

In the Claims

Column 16, Line 1, in Claim 13, "loci" should be corrected to "log"

Signed and Sealed this
Twenty-first Day of March, 2023

Katherine Kelly Vidal
Director of the United States Patent and Trademark Office